United States Patent
Omar et al.

(10) Patent No.: US 6,942,106 B1
(45) Date of Patent: Sep. 13, 2005

(54) WOUND POLYPROPYLENE YARN FILTER CARTRIDGE AND METHOD FOR MAKING SAME

(76) Inventors: Ahmad Omar, 68-2 5th Street, Defence Phase 5, Karachi (PK); Hamid Omar, 54-1 4th Street, Defence Phase 5, Karachi (PK)

( * ) Notice: Subject to any disclaimer, the term of this patent is extended or adjusted under 35 U.S.C. 154(b) by 311 days.

(21) Appl. No.: 09/568,951

(22) Filed: May 11, 2000

(51) Int. Cl.[7] .............................................. B01D 39/16
(52) U.S. Cl. ................. 210/457; 210/497.1; 210/500.1; 57/289; 57/292; 264/103; 264/130; 264/211.14
(58) Field of Search ................................ 210/457, 483, 210/488, 496, 497.01, 497.1, 497.2, 500.1; 57/289, 292; 264/130, 211.14, 233, 103

(56) References Cited

U.S. PATENT DOCUMENTS

| | | | | |
|---|---|---|---|---|
| 2,783,609 A | * | 3/1957 | Breen ........................... | 210/496 |
| 4,038,811 A | | 8/1977 | Ansin | |
| 4,048,075 A | | 9/1977 | Colvin | |
| 4,052,317 A | * | 10/1977 | Palnik ...................... | 210/323.2 |
| 4,096,611 A | * | 6/1978 | Heyner ......................... | 28/220 |
| 4,253,228 A | * | 3/1981 | Easley ...................... | 242/480.8 |
| 4,571,793 A | | 2/1986 | Price | |
| 4,933,130 A | | 6/1990 | Bruckner | |
| 4,940,559 A | | 7/1990 | Kretschmann | |
| 5,057,368 A | * | 10/1991 | Largman et al. ............ | 428/397 |
| 5,059,104 A | | 10/1991 | Alberto | |
| 5,379,501 A | | 1/1995 | Goineau | |
| 5,466,406 A | * | 11/1995 | Liu .............................. | 264/103 |

OTHER PUBLICATIONS

Hamid Omar, Aug. 2001, Water Conditioning and Purification Magazine, vol. 43, No. 8.*

* cited by examiner

*Primary Examiner*—Matthew O. Savage
(74) *Attorney, Agent, or Firm*—Robert L. Marsh

(57) ABSTRACT

A filter cartridge formed of wound polypropylene yarn lacking a spin-finish and method of making same are disclosed herein. The method includes the steps of: providing a filter core; providing a plurality of continuous polypropylene filaments; applying water to the filaments without applying a spin finish to remove static therefrom; gathering together a plurality of the filaments to form at least two bundles; air texturing the at least two bundles of filaments to form a yarn; and winding said yarn around said filter core to provide a filter media.

3 Claims, 3 Drawing Sheets

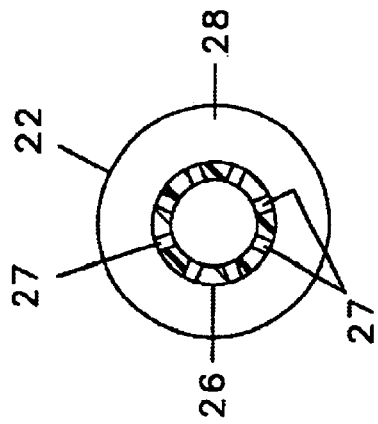
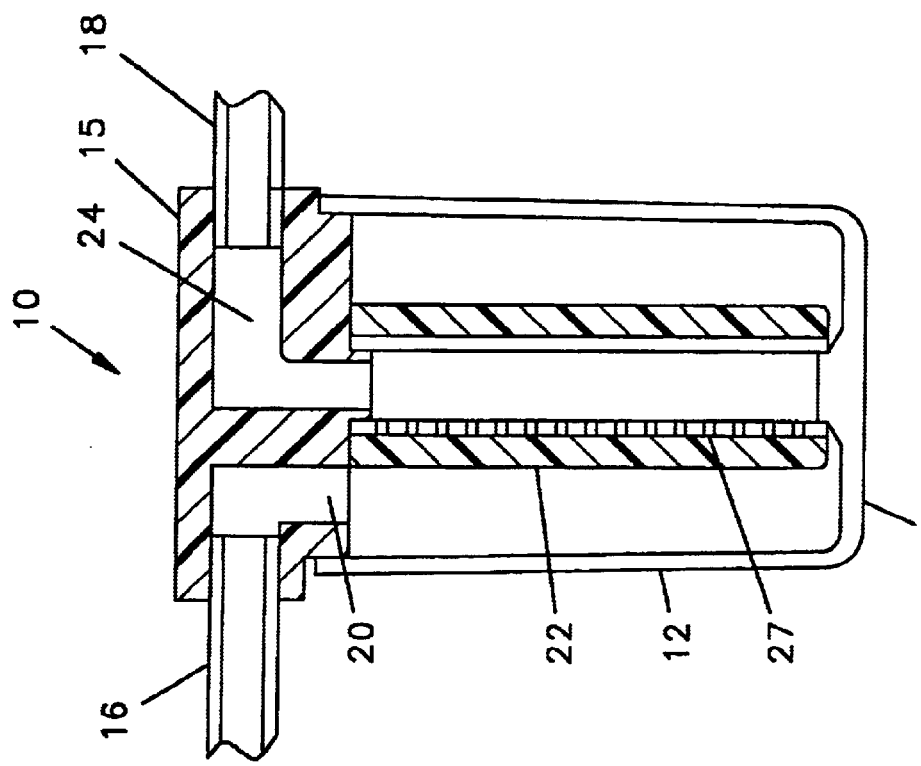

WOUND POLYPROPYLENE YARN FILTER CARTRIDGE AND METHOD FOR MAKING SAME

The present application relates to the manufacture of a filter cartridge, and particularly to the manufacture of a yarn suitable for use in a filter cartridge used to filter out suspended impurities from water for human use.

BACKGROUND OF THE INVENTION

Water for human consumption originates from wells or lakes, and it is often desirable to filter the water before it is consumed, or used to process foods which may be contaminated thereby.

Although filters may exist in any number of configurations, filters usable by the general public to filter water within a home typically have a cylindrical chamber for receiving a replaceable tubular filter cartridge. The filter cartridge has an inner core or bobbin made of a suitable material such as polypropylene, which is inert, and will not cause contamination to the water being filtered. One commonly sized filter receives a filter cartridge having a perforated inner core with a diameter of approximately one inch and an overall length of approximately 10 inches.

Extending around the circumference of the inner core is a filter media, which may be made of any suitable substance, which has a fine porosity for providing a desired filtration. Specifically, the filter media must have porosity with openings therein sized to trap particles of contaminants within the filter media, and yet have pores sufficiently large to allow the water to pass there through. Although numerous filter media are currently available, a common media in filter cartridges employed for home use consist of polypropylene yarn wound around the core. Polypropylene is considered desirable because it is an inert material the presence of which will not cause contamination to the water being filtered. As an alternative to yarn or roving, a filter media has been made by blowing pieces of polypropylene fiber into a mat which is then wrapped around the filter core as shown in U.S. Pat. No. 4,048,075.

There are certain problems, however, with existing filter cartridges which employ polypropylene as a filter media. First, media made from polypropylene yarn, or roving, are manufactured to have properties similar to those of yarns made of natural fibers, such as cotton yarn. Such synthetic yarns, therefore, have lubricants and other chemicals on their surfaces to reduce friction between adjacent fibers and anti-static agents to control the effects of static electricity. In the absence of an anti-static agent, static electricity will build up on the fibers and cause the fibers to repel one another such that they cannot be spun into yarn. When synthetic yarn having chemicals on the surfaces thereof are used as a filter media, some of the chemicals will become dissolved in the water being filtered, thereby causing a degree of contamination to the filtered water.

Although it is theoretically possible to wash the lubricants and other chemical material out of the manufactured filters, such rinsing would be time consuming and expensive. Once washed, the filters must be dried prior to packaging, and the drying process would require the application of heat for a duration of time which would greatly enhance the cost of the end product.

Bruckner, U.S. Pat. No. 4,933,130 discloses a method of manufacturing a spin finish free yarn for a polymer having a glass transition above 100 centigrade. This method employs a drawing step to evaporate liquid used to avoid static. Ploypropylene, however, has a glass transition of −15 Centigrade.

Another problem with existing filter media made from polypropylene is that the filaments thereof are not continuous. During the course of manufacture of the yarn, filaments of polypropylene are cut into lengths ranging from one inch to four inches long. Similarly, filter media formed as a mat wrapped around a core are also made from relatively short lengths of filament. When existing polypropylene filter media are used to filter water, small fragments of polypropylene fibers are subject to "migration" within the filter mass. Specifically, some of the fragments of the fibers may escape the mass of the filter media and enter the stream of otherwise filtered water such that the filter itself again causes some contamination to the water.

Despite the problems which have existed with its use, polypropylene stands as a leading choice for a filter media. It would, therefore, be desirable to provide a filter media which employs polypropylene fibers but which would not be subject to the migration of filament fragments into the water stream and would not have surface chemicals which could contaminate the water being filtered.

SUMMARY OF THE INVENTION

The present invention is embodied in a filter cartridge having a perforated tubular care made of a suitable substance such as polypropylene for retaining a filter media around the circumference thereof. Wound around the filter core is a filter media consisting of an air-textured continuous yarn of polypropylene filaments with the windings having a sufficient density and quantity to provide the desired filtration to entrap particles of impurities suspended in the water passing there through.

We have found that continuous polypropylene filament yarn suitable for use as a filter media can be manufactured without applying a spin finish, lubricants, or other chemicals. The filaments of the yarn are extruded using existing melt-spinning methods such as described in U.S. Pat. Nos. 5,059,104 and 4,940,559. Pure water is applied to the surface of the filaments as an anti-static agent rather than the chemicals of conventional spin finishes. The filaments are then air textured using existing air texturing methods such as described in U.S. Pat. Nos. 5,379,501; 4,038,811; and 4,571,793. Air texturing imparts random crimps, loops, and curls, bows and the like to the yarn and also entangles the filaments thereof. The yarn is then wound around a filter core to form the filter media.

BRIEF DESCRIPTION OF THE DRAWINGS

A better and more complete understanding of the present invention will be had by a reading of the following detailed description taken in conjunction with the drawings wherein:

FIG. 1 is a cross sectional view of a typical water filter with a filter cartridge fitted therein;

FIG. 2 is a cross-sectional view of the filter cartridge shown in FIG. 1;

DETAILED DESCRIPTION OF THE PREFERRED EMBODIMENT

Figure 3:
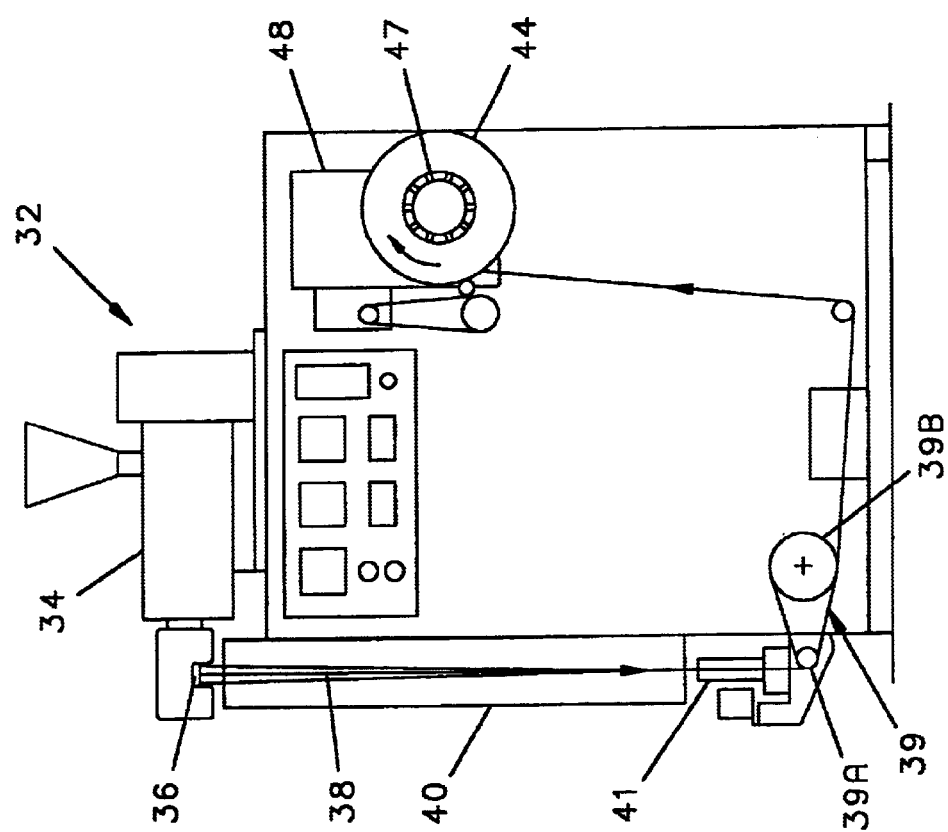
FIG. 3 is a front view of a machine for manufacturing a polypropylene yarn free of a spin finish suitable for use as a filter media of the filter cartridge shown in FIG. 2.

Referring to FIGS. 1 and 2, a typical water filter 10 has a generally cylindrical chamber 12, the lower end 14 of which is sealed. The chamber 12 is removably attached to a headpiece 15, and attached to the headpiece 15 is an input line 16 and an output line 18. Incoming water is received through the input line 16 and is directed by a first duct 20 to the outer circumference of the chamber 12. The water then passes through the filter media which makes up the wall of the filter cartridge 22. The filtered water flows to the center of the filter cartridge and is then channeled through a second duct 24 centrally located in the headpiece 15, which directs the water to the output line 18. The wall of the filter cartridge 22 is sealed against the lower end 14 and the headpiece 15 such that water entering through the input line 16 must pass through the filter media of the filter cartridge 22 to reach the output line 18. As the water passes through the filter media, the suspended impurities therein are filtered out of the water and retained in the media.

Referring to FIG. 2, a typical filter cartridge 22 has a porous tubular core 26 made of an inert material such as polypropylene or stainless steel having a pattern of perforations 27 therein through which water may freely flow. Wrapped around the core 26 is a suitable filtering media 28. The filter media 28 must have a density and structure which is sufficient to entrap particles of impurities in the water and yet not so dense as to unnecessarily increase the resistance to the flow of water through the filter 10. In the preferred embodiment, the filter media 28 is made of continuous strand of air textured polypropylene yarn the surfaces of which are free of chemical impurities of the type left by a spin finish.

Figure 5:
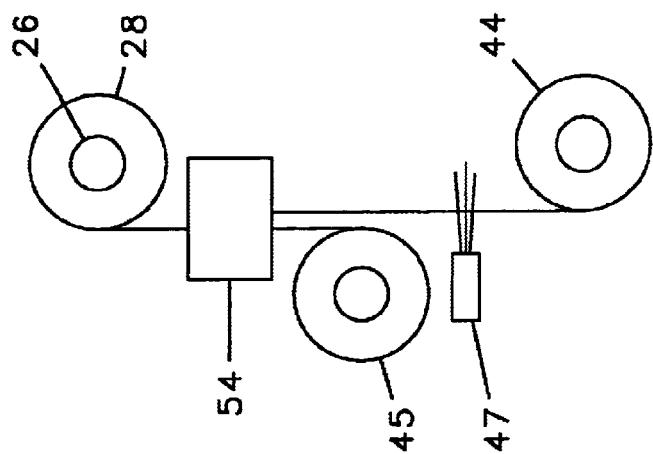
FIG. 5 is a schematic drawing of the steps for air texturing the yarn.
Figure 4:
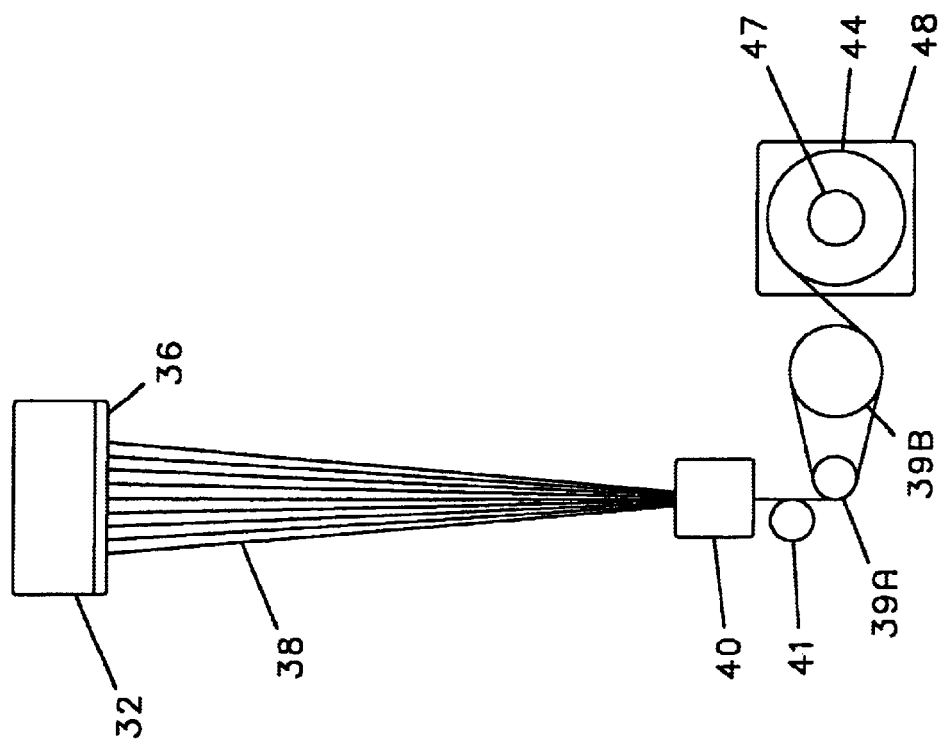
FIG. 4 is a schematic drawing of the steps for manufacturing a spin finish free polypropylene yarn suitable for use as a filter media.

Referring to FIGS. 3, 4 and 5, a melt spinning process is used to form polypropylene filaments. The process requires an extruder 32 having a screw and barrel 34, which melts and compresses the polypropylene resin. The molten polypropylene is forced through a plurality of orifices in a spinneret plate 36 to form a plurality of filaments 38. Molten filaments 38 are then cooled by a current of cool air as they are drawn downward by a godet 39, having rolls 39A and 39B, through a quench cabinet 40. At the lower end of the quench cabinet 40, the cooled filaments are gathered together into one or more discrete bundles, each of which has a plurality of filaments.

Existing melt spinning machines apply a spin finish to the bundles of filaments which are drawn out the lower end of the quench cabinet 40. The spin finish normally includes a lubricant, an anti-static agent and emulsifier, and each of the chemicals provides an important function in the manufacture of conventional yarn. The anti-static agent prevents the buildup of static on the filaments so that they can be retained in a bundle without repelling one another. The chemicals can be applied using any of a number of methods such as a roller, spray, or bath. However, when a filter is made from a yarn having a spin finish, those chemicals will wash into the water passing through the filter causing contamination.

In accordance with the present invention, purified water is used as an anti-static agent and is applied by a roller 41 to the cooled filaments 38 exiting from the quench cabinet 40. Any of the existing methods for applying a spin finish may be used to apply the water to the filaments, and the water will serve as an anti-static agent and allow the filaments to be gathered and wound. By applying only purified water to the filaments, the chemicals applied in a spin finish to manufacture synthetic yarns are eliminated.

The strength of commercially available yarn is enhanced by stretching or drawing the filaments as a result of looping them around a pair of godet rolls, the outer surfaces of which move at different speeds. The filaments of yarn used in a filter, however, are only subjected to compressive forces because the liquid being filtered is forced from the surrounding chamber of the filter, through the filter media into the center of the core, and the strength of the filaments is not an important factor. The godet 39, therefore, is not heated and, therefore, it operates at ambient temperature and at a suitable speed to merely draw the filaments 38 through the quench cabinet 40, thereby reducing the energy demands of the manufacturing process. The filaments are then wound into a spool 44 on a bobbin 47 by a take up winder 48.

Referring further to FIG. 5, the filaments 38 are next air textured by loading a core spool 44 and an effect spool 45 of wound filament on a conventional air-texturing machine 54. Air-textured yarn for use in filter cartridges should be preferably of "core and effect" construction with a large number of loops and crimps. Known methods to produce such types of yarns are disclosed in U.S. Pat. Nos. 4,038,811 and 5,379,501. Both these references disclose a method of making core and effect air-textured yarn from filaments where either the core, or the effect, or both core and effect yarns are drawn just before being presented to the air texturing jet. In the present invention, however, the core and effect filament yarns are not drawn at the air-texturing machine. It has been found that wetting the core yarn using any appropriate means such as a spray 47 before it enters the texturing jet improves the air-texturing process.

The number of filaments and the filament diameter required to make an air-textured yarn suitable for use as a filter media may vary widely. Generally using more filaments of smaller diameter will make a filter cartridge that will trap finer particles if other variables remain the same. It has been found that most filter requirements are met by using polypropylene filaments whose denier is between 3 and 10, where denier is the weight of 9000 meters of yarn or filament expressed in grams. The number of filaments comprising the core of the air-textured yarn should vary between 50 and 200, and the number of filaments comprising the effect of the air-textured yarn should vary between 100 and 400. Although other combinations may also be used, the above combinations will make a satisfactory air-textured yarn for the filter media 28 of a filter cartridge 22.

For the best results, the core should have an overfeed ratio of 3 to 10 percent and the effect should have an overfeed ratio of 50 to 150 percent for producing air-textured yarn suitable for use in a filter cartridge. The cross-section of the polypropylene filaments may be round or multi-lobal, and it has been observed that using a multi-lobal filament increases the efficiency of the filter media. The cross-sectional shape of the filaments is determined by the shape of the holes of the spineret plate. A trilobal cross-section of the filaments provides a better dirt-holding capacity than a filter media with filaments having round cross-section.

The air-textured yarn is wound in a generally criss-cross or diamond weave pattern on the perforated core 26 to complete the filter cartridge 28. The size of the particles that the filter will retain will depend upon the quantity of yarn wound, the tension at which the yarn is wound, the lateral displacement between corresponding yarns on each successive traverse of the winding, the diameter of the individual filaments, and the structure of the loops formed during air texturing.

EXAMPLE

A fiber grade polypropylene having a melt flow index of 15 is melt spun as shown in FIGS. 3 and 4. The total number of filaments extruded from the spinneret is 400. The filaments are brought together in four discrete bundles of 100 filaments each at the bottom of the quench cabinet of the extruder. Water is applied to all the bundles by a "lick roll" before they are drawn off by the godet roll at a speed of 750 meters per minute. The four bundles of filaments are wrapped around the godet roll three times. The bundles are then separately wound on the bobbins of four take-up winders. The rate of flow of the molten polypropylene is such that the denier of each filament is 5. The melt spinning production rate is 10 kilograms per hour.

The wet filament yarn spools are put on an air-texturing machine to make core and affect air-textured yarn. One filament yarn spool consisting of 100 filaments and total denier of 500 is used for the core yarn. Two yarn spools totaling 200 filaments and having a combined denier of 1000 is used for the effect yarn. The core yarn over-feed is set at 4 percent and the effect yarn over-feed is set at 100 percent. The texturing jet that is supplied with oil free compressed air at 100-PSI pressure. The yarn exiting the texturing jet is drawn off at a speed of 140 meters per minute and is wound on a bobbin at 150 meters per minute. The final denier of the air-textured yarn is approximately 2500. The production rate is 2.5 kilograms per hour per texturing position. Four air-texturing machines are used to match the melt spinning production rate of the extruder.

The core 26 shown in FIG. 2 is injection molded from polypropylene. It has a length of 10 inches and an outer diameter of 1.25 inches and a wall thickness of 0.1 inches, and has a total of 216 rectangular shaped perforations. The dimensions of each perforation are approximately 0.2 inch by 0.25 inch. A precision winding machine with a traverse of ten inches is used to wind two strands of air-textured yarn on the core at a combined tension of 100 grams. The winding pattern of the winder is adjusted such that the yarn of each layer, formed by one double traverse of the winder, is alternately displaced by approximately 0.06 inch from the corresponding yarn of the preceding layer. Approximately 150 grams of yarn are wound on each core to make a cartridge. The completed cartridges are dried in hot air before packaging.

As explained above, a filter cartridge 22 manufactured with yarn 56 will not be subject to migration of fragments of fibers because there will be no loose fibers. Similarly, there are no chemicals on the surfaces of the fibers to contaminate water being filtered there through.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. The method of manufacturing a filter cartridge comprising the steps of, providing a filter core, providing a plurality of continuous polypropylene filaments, applying water to said filaments, without applying a spin finish, to remove static therefrom, thereafter, gathering together a plurality of said filaments to form at least two bundles; and then air texturing said at least two bundles of filaments to form a yarn, and winding said yarn around said filter core to provide a filter media.

2. A filter manufactured using the method of, providing a filter core, providing a plurality of continuous polypropylene filaments, applying water to said filaments, without applying a spin finish, to remove static from the surface thereof, thereafter gathering together a plurality of said filaments to form at least two bundles; and then air texturing said at least two bundles of filaments to form a yarn, and winding said yarn on said filter core to form a filter media.

3. A filter manufactured using the method of, providing a filter core, using a melt spinning process to form a plurality of continuous polypropylene filaments, applying water to said polypropylene filaments, without applying a spin finish, to remove static from the surface thereof, thereafter, gathering together said plurality of said filaments to form at least two bundles, wrapping each of said bundles on a separate spool while said bundles are still wet, providing an air texturing machine for receiving a core input spool and an affect input spool, placing said one of said wet spools of bundled filaments on said means for receiving a core input spool and placing a second of said wet spools of bundled filaments on said means for receiving an affect input spool, then air texturing said one and said second spools of filaments to form a yarn, and then winding said yarn on said filter core to form a filter media.

\* \* \* \* \*